March 5, 1963 E. R. ESCOLA 3,080,201
FLUID PRESSURE CYLINDERS
Filed Sept. 1, 1961
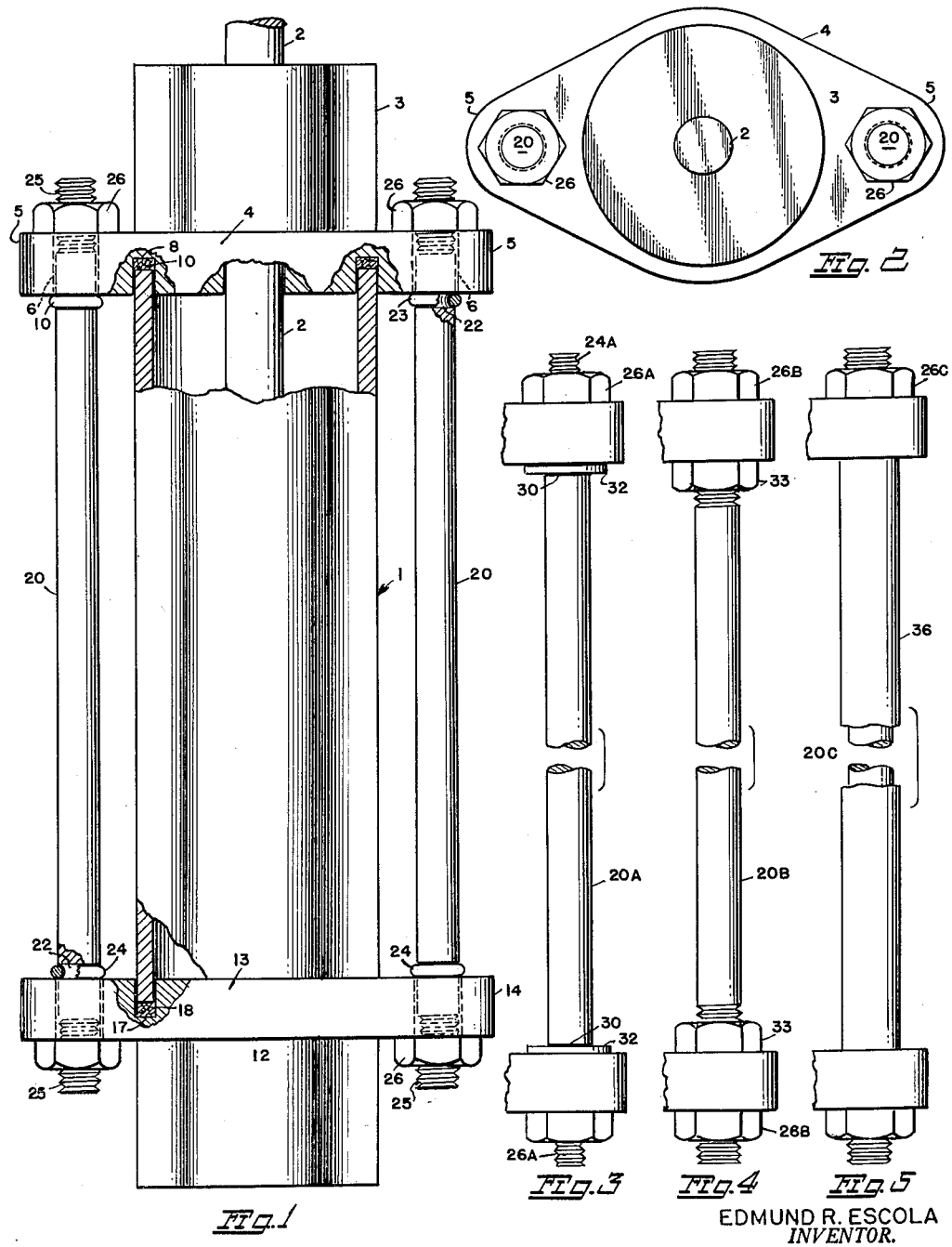
EDMUND R. ESCOLA
INVENTOR.
BY James L. Girnan
ATT'Y

United States Patent Office 3,080,201
Patented Mar. 5, 1963

3,080,201
FLUID PRESSURE CYLINDERS
Edmund R. Escola, Clatskanie, Oreg.
Filed Sept. 1, 1961, Ser. No. 135,642
5 Claims. (Cl. 309—2)

This invention relates to improvements in fluid pressure cylinders and has for one of its principal objects to provide a structure including cylinder heads, guide means for applying the heads to the cylinder in such a manner as to prevent any binding between the heads and the ends of the cylinder, sealing means between the heads and the ends of the cylinder, and means to provide limit stops in applying the heads to the ends of the cylinder to prevent excessive compression forces on the ends of the cylinder and the prevention of extrusion of the sealing material under such compressive forces.

The foregoing and other objects and advantages which will become subsequently apparent reside in the details of construction and operation as more fully hereinafter described and claimed, reference being had to the accompanying drawing forming a part hereof and in which:

FIGURE 1 is an elevational view of a fluid pressure cylinder showing the invention applied thereto and with fragments broken away for convenience of illustration.

FIGURE 2 is a top plan view of FIGURE 1.

FIGURES 3 and 4 are elevational views of modified forms of tie rods, and

FIGURE 5 is a similar view of a further modification.

Referring now more particularly to the drawing wherein like references of character designate like parts, reference numeral 1 indicates a cylinder intended for high pressure hydraulic service having a piston (not shown) on its interior and provided with a piston rod 2 slidably journalled in a head 3 integrated with a flange 4 having ears 5 provided with apertures 6 therethrough.

The underside of the head 3 is provided with an annular groove 8 for the reception of a ring 10 of suitable sealing material.

The opposite end of the cylinder 1 is provided with a head indicated generally at 12 and sometimes referred to as a cap since no piston rod passes through it. The head 12 is similarly integrated with a flange 13 having ears 14 provided with apertures 15 extending therethrough. The top side of the flange 13 is provided with an annular groove 17 for the reception of a ring 18 of suitable sealing material.

In securing the heads 3 and 12 to their respective ends of the cylinder 1, I provided identical tie rods 20 each provided with an annular groove 22 near both of its ends for the reception of top and bottom split rings 23 and 24 respectively. The extremities of the tie rods are threaded as at 25 to accommodate nuts 26. In assembling the cylinder 1 and heads 3 and 12, the bottom end of the cylinder is inserted within the annular groove 17 and pressed against the sealing ring 18 therein. The bottom ends of the tie rods 20 are then inserted through the apertures 15 in the ears of flange 13 until the bottom split rings 24 rest upon the top surface of the ears. Advancement of the nuts 26 on the threaded extremities 27 of the tie rods will secure those ends to the ears 14 with the tie rods parallel to the side walls of the cylinder 1.

The head 3 is similarly applied to the top end of the cylinder 1 by the reception of the top end of the cylinder within the annular groove 8 against the sealing ring 10 therein. Such engagement is guided by passage of the top ends of the tie rods 20 through the apertures 6 in ears 14 of the flange 13. Advancement of the top nuts 26 on the threads of the tie rods will secure the head 3 to the top end of the cylinder 1 with the ears 5 bearing against the top split rings 23 and the top of the cylinder compressing the sealing ring 10.

From the foregoing it will be readily apparent that either head 3 or 12 can be applied to the cylinder in the manner described without any binding action relative to the tie rods or to the grooves 8 or 17 and that excessive compression forces against the sealing rings 10 or 18 and possible distortion to the cylinder walls will be prevented by the reaction of the top split rings 23 against the ears 5 and 14 and hence their respective flanges 4 and 13.

In the modified form of the invention shown in FIGURE 3, I dispense with the split rings 23—24 and instead provide a shoulder 30 on each tie rod 20A by reducing the diameter of both ends thereof and threading the same as at 24A. Each shoulder 30 provides a seat for a steel washer 32 which serves the same purpose as the split rings shown in the first form of the invention when the nuts 26A are advanced on the threaded ends of the tie rods.

In the modification shown in FIGURE 4, lock nuts 33 on the threaded ends of the tie rods 20B bear against one side of their respective ears of the head flanges and react against nuts 26B on the opposite side thereof.

In the further modification shown in FIGURE 5, I dispense with the annular grooves 22 of FIGURE 1, the shoulder 30 of FIGURE 3, the lock nuts 33 of FIGURE 4, and instead provide tubular members 36 through which the tie rods 20C extend and the tubular members are of a predetermined length to absorb any excessive compressive forces which would be applied to the ends of the cylinders by the nuts 26C in the absence of the tubular members.

While I have shown particular forms of embodiment of my invention, I am aware that many minor changes therein will readily suggest themselves to others skilled in the art without departing from the spirit and scope of the invention. Having thus described my invention what I claim as new and desire to protect by Letters Patent is:

1. A fluid pressure cylinder assembly comprising a cylindrical tube having continuous cylindrical inner and outer surfaces, a cylinder head for each end of the cylinder, each of said heads having an annular groove therein for the reception of the respective ends of the cylinder, sealing means disposed in each of said grooves, said heads having aligned openings therethrough exteriorly of the cylinder, tie rods extending through said openings, threaded means on both ends of said tie rods for applying compressive forces against the heads and against their respective ends of the cylinder, limit stops on said tie rods to prevent excessive compressive forces against said heads and against the ends of said cylinder.

2. A fluid pressure cylinder assembly comprising a cylindrical tube having continuous cylindrical inner and outer surfaces, a cylinder head for each end of the cylinder, each of said heads having an annular groove therein for the reception of the respective ends of the cylinder, sealing means disposed in each of said grooves, said heads having aligned openings therethrough exteriorly of the cylinder, tie rods extending through said openings, each of said tie rods having an annular groove near both of its ends, a detent disposed in each of said grooves, the extremities of said rods being threaded and extending through said alligned openings, and nuts threadedly engaged with the threaded ends of the tie rods for forcing said heads against said detents.

3. A fluid pressure cylinder assembly comprising a cylindrical tube having continuous cylindrical inner and outer surfaces, a cylinder head for each end of the cylinder, each of said heads having an annular groove therein for the reception of the respective ends of the cylinder, sealing means disposed in each of said grooves, each of said heads integrated with a flange having ears provided with apertures extending therethrough, tie rods extending through said apertures, each of said tie rods having a shoulder near both of its ends threaded there-beyond and extending through said apertures, and nuts applied to said threaded extended ends of the tie rods for forcing said heads against their respective ends of the cylinder and against said shoulders.

4. A fluid pressure cylinder assembly as claimed in claim 3 including washer elements between said shoulders and said ears.

5. A fluid pressure cylinder assembly comprising a cylindrical tube having continuous cylindrical inner and outer surfaces, a cylinder head for each end of the cylinder, each of said heads having an annular groove therein for the reception of the respective ends of the cylinder, sealing means disposed in each of said grooves, each of said heads integrated with a flange having ears provided with apertures extending therethrough, each of said tie rods having threaded ends extending through said apertures, nuts threadedly engaged with said ends of the rods and bearing against one side of each of said ears, and cooperating nuts threadedly engaged with said tie rods for forcing said heads against the first mentioned nuts.

References Cited in the file of this patent

UNITED STATES PATENTS 2,755,775     Flick et al. _____ July 24, 1956

FOREIGN PATENTS 1,038,339     Germany _____ Sept. 4, 1958